United States Patent
Utagawa

(10) Patent No.: US 8,713,396 B2
(45) Date of Patent: Apr. 29, 2014

(54) TRANSMISSION APPARATUS, RECEIVING APPARATUS, METHOD, AND STORAGE MEDIUM

(75) Inventor: Yuka Utagawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 12/814,370

(22) Filed: Jun. 11, 2010

(65) Prior Publication Data

US 2010/0318870 A1 Dec. 16, 2010

(30) Foreign Application Priority Data

Jun. 16, 2009 (JP) .................................. 2009-143531

(51) Int. Cl.
*H04L 1/18* (2006.01)

(52) U.S. Cl.
USPC .......................................... 714/751; 714/750

(58) Field of Classification Search
USPC .......... 340/7.25; 235/487; 370/311; 709/219; 714/748, 750, 751; 463/42; 455/518
See application file for complete search history.

(56) References Cited

U.S. PATENT DOCUMENTS

| | | | |
|---|---|---|---|
| 5,196,842 A * | 3/1993 | Gomez et al. ................ | 340/7.25 |
| 6,830,515 B2 * | 12/2004 | Rowe .............................. | 463/42 |
| 6,951,305 B2 * | 10/2005 | Overhultz et al. ........... | 235/487 |
| 7,374,096 B2 * | 5/2008 | Overhultz et al. ........... | 235/487 |
| 7,756,539 B2 * | 7/2010 | Milstein et al. .............. | 455/518 |
| 7,765,280 B2 * | 7/2010 | Akins, III .................... | 709/219 |
| 2010/0278087 A1 * | 11/2010 | Kawakami et al. .......... | 370/311 |

FOREIGN PATENT DOCUMENTS

| | | |
|---|---|---|
| JP | 2005-328131 A | 11/2005 |
| JP | 2007-324943 A | 12/2007 |

* cited by examiner

*Primary Examiner* — David Ton
(74) *Attorney, Agent, or Firm* — Canon USA Inc. IP Division

(57) ABSTRACT

In a transmission apparatus for transmitting periodical data transmitted at predetermined intervals and event data transmitted in response to occurrence of an event, an information generation unit generates identification information for a receiving apparatus to identify transmitted event data, and a control unit includes the generated identification information in the periodical data in response to generation of identification information by the identification information generation unit.

21 Claims, 10 Drawing Sheets

TRANSMISSION APPARATUS, RECEIVING APPARATUS, METHOD, AND STORAGE MEDIUM

BACKGROUND OF THE INVENTION

1. Field of the Invention

The present invention generally relates to data transmission and reception, and more particularly to a method for transmitting data periodically transmitted and data transmitted in response to the occurrence of an event.

2. Description of the Related Art

Methods for determining a packet loss in periodical packets which are periodically and continuously transmitted include confirming a sequence number assigned to the packet. A receiving apparatus can detect the packet loss by finding that the sequence number is missing.

On the other hand, Japanese Patent Application Laid-Open No. 2005-328131 discusses a method for determining a packet loss in an event packet transmitted in response to the occurrence of an event. In Japanese Patent Application Laid-Open No. 2005-328131, a transmission apparatus adds different marker bits to a head packet and a tail packet respectively in a packet group relating to a telop which is non-periodically transmitted. A receiving apparatus determines, when it does not receive the tail packet within a predetermined period of time elapsed since it received the head packet, that the tail packet is lost.

However, it may take time until a loss in event data is detected depending on the event data.

As an example of such a case, the number of packets belonging to a packet group in event data varies. If the number of packets belonging to a packet group in event data varies, an actual period of time and a predicted period of time elapsed since a head packet was received until a tail packet is received differ from each other. Particularly when the number of packets in the packet group becomes smaller than that in a packet group in event data so far received, the predicted period of time elapsed since the head packet was received until the tail packet is received becomes longer than the actual period of time. If the packet is waited for until the predicted period of time elapses, it takes time until a loss in the tail packet is detected. When the number of packets in the event data differs depending on an event, therefore, it may take time until a loss in the event data is detected.

If the number of packets in the event data is only one, different marker bits cannot be added to a head packet and a tail packet, respectively. Accordingly, a packet loss in the event data cannot be detected until the succeeding event data is received, for example.

SUMMARY OF THE INVENTION

The present invention is directed to enabling earlier detection of a loss in event data transmitted in response to the occurrence of an event.

According to an aspect of the present invention, a transmission apparatus for transmitting periodical data transmitted at predetermined intervals and event data transmitted in response to occurrence of an event to a receiving apparatus includes an identification information generation unit configured to generate identification information for the receiving apparatus to identify transmitted event data, and a control unit configured to include the generated identification information in the periodical data in response to generation of the identification information by the identification information generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. It is to be noted that the relative arrangement of the components, the numerical expressions, and numerical values set forth in these embodiments are not intended to limit the scope of the present invention.

Exemplary embodiments of the present invention will be described below with reference to the drawings.

Suitable exemplary embodiments applied to an apparatus for transmitting a moving image file using transport protocol for real-time applications (RTP) will be described in detail.

Figure 1:
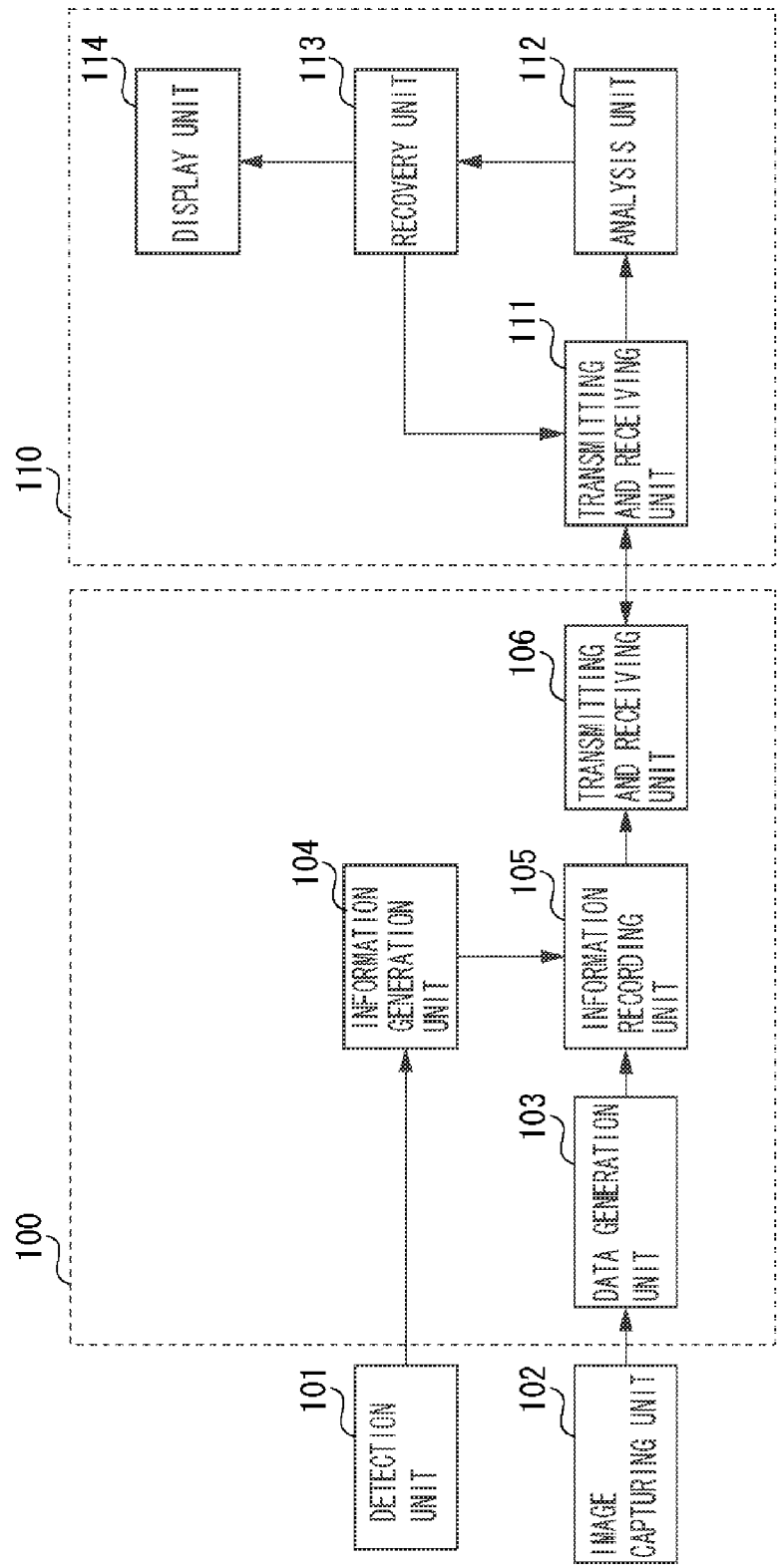
FIG. 1 is a block diagram illustrating an example of the functional configuration of a transmission apparatus and a receiving apparatus according to a first exemplary embodiment.

FIG. 1 is a block diagram illustrating an example of the functional configuration of a transmission apparatus 100 and a receiving apparatus 110 according to the present exemplary embodiment.

The transmission apparatus 100 includes a data generation unit 103, an information generation unit 104, an information recording unit 105, and a transmitting and receiving unit 106. Although the transmission apparatus 100 according to the present exemplary embodiment is configured separately from a detection unit 101 and an image capturing unit 102, the transmission apparatus 100 may include the detection unit 101 and the image capturing unit 102. More specifically, the transmission apparatus 100 may be implemented by an image capture apparatus such as a network camera, or one or a plurality of computers for distributing video data captured by the image capture apparatus.

The detection unit 101 detects an event which is based on video data or input from a user. The detection unit 101 detects an event based on the results of person detection and motion detection from the video data, for example. The detection unit 101 also detects an event based on the results of audio detection and temperature change detection. Further, the detection unit 101 detects an event when a user of the receiving apparatus 110 or a user of another receiving apparatus connected to the transmission apparatus 100 issues an instruction to change parameters in the image capturing unit 102, for example. Parameters changed by a user's operation include, for example, an operation relating to an imaging area (pan, tilt, or zoom operation), an operation for changing the resolution of video data, and an operation relating to authority acquisition for control of the image capturing unit 102. The parameters are not limited to these. The detection unit 101 notifies the information generation unit 104 of the detected event. The image capturing unit 102 transmits captured video data, to the data generation unit 103.

The data generation unit 103 packetizes the video data obtained from the image capturing unit 102 to transmit the video data to the receiving apparatus 110 via a network, and delivers obtained video packets to the information recording unit 105. The video packets are periodical data transmitted at predetermined intervals.

The information generation unit 104 packetizes information relating to the event notified from the detection unit 101 to notify the receiving apparatus 110 of the information, and delivers obtained event packets to the information recording unit 105. The event packet is event data transmitted in response to the occurrence of the event. The event in the present exemplary embodiment non-periodically occurs. The information generation unit 104 generates identification information for identifying the event packet, and delivers the identification information to the information recording unit 105. The receiving apparatus 110 can identify the event packet transmitted by the transmission apparatus 100 based on the identification information. More specifically, the information generation unit 104 generates identification information for the receiving apparatus 110 to identify the transmitted event packet (event data). The details of the identification information will be described below.

The information recording unit 105 determines, based on the event packet delivered from the information generation unit 104 and the video packet delivered from the data generation unit 103, the order in which the packets are transmitted. The information recording unit 105 adds the identification information delivered from the information generation unit 104 to a header of the video packet transmitted after the event packet is transmitted based on the determined transmission order. More specifically, the information recording apparatus 105 includes the generated identification information in the video packet (periodical data). The information recording unit 105 delivers to the transmitting and receiving unit 106 the event packet and the video packet including the identification information based on the determined transmission order.

Figure 4:
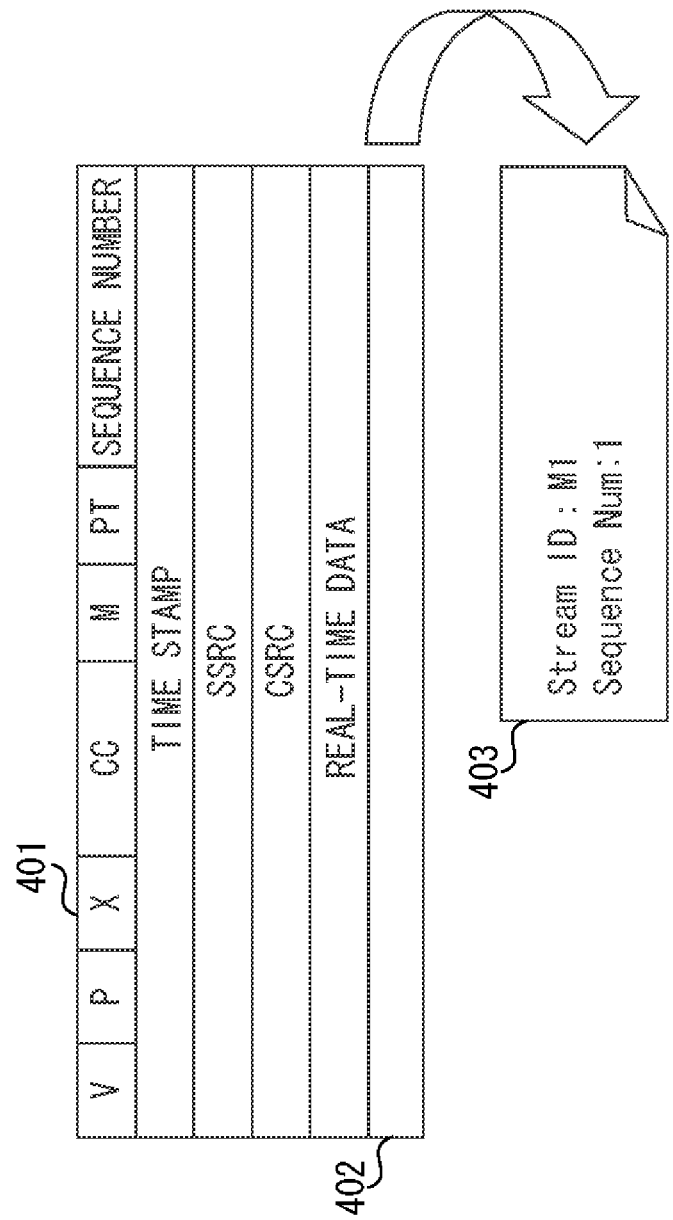
FIG. 4 illustrates an example of identification information for identifying event data.

FIG. 4 illustrates an example in which identification information for identifying an event packet (event data) is included in a video packet (periodical data). In the present exemplary embodiment, identification information is included in a header of a video packet in an RTP format (RTP header). As illustrated in FIG. 4, identification information 403 is recorded in an extended area 402 of the RTP header. The information recording unit 105 sets an extension bit 401 of the RTP header to make the extended area 402 of the RTP header effective. Thus, the identification information can be recorded in the extended area of the RTP header. As illustrated in FIG. 4, the information recording unit 105 in the present exemplary embodiment records a sequence number assigned to the event packet and identification information (a stream identifier (ID)) corresponding to the type of event as the identification information for identifying the event packet. Even when event packets corresponding to a plurality of types of events are transmitted in the same period, the event packets can be identified by recording the stream IDs. When the event packet can be identified by only the sequence number, the stream ID need not be recorded. Although in the present exemplary embodiment, the sequence number assigned to the event packet is used as the identification information, information relating to a time stamp representing the date on which an event packet is transmitted, for example, may be used.

The transmitting and receiving unit 106 transmits the event packet and the video packet, which have been delivered from the information recording unit 105, to the receiving apparatus 110 via the network. More specifically, the transmission apparatus 100 transmits to the receiving apparatus 110 video packets (periodical data) transmitted at predetermined intervals and event packets (event data) transmitted according to the occurrence of an event or events.

The receiving apparatus 110 according to the present exemplary embodiment includes a transmitting and receiving unit 111, an analysis unit 112, a recovery unit 113, and a display unit 114. The transmitting and receiving unit 111 receives the video packet and the event packet, which have been transmitted by the transmission apparatus 100, and delivers them to the analysis unit 112.

The analysis unit 112 analyzes the identification information included in the video packet received by the transmitting and receiving unit 111. The analysis unit 112 identifies the event packet, which has not been received, out of the event packets transmitted by the transmission apparatus 100 based on the result of the analysis of the identification information. The analysis unit 112 identifies the video packet, which has not been received, out of the video packets transmitted by the transmission apparatus 100 based on a sequence number assigned to the video packet. The analysis unit 112 delivers to the recovery unit 113 information relating to the packet, which has not been received, out of the video packets and the event packets transmitted by the transmission apparatus 100.

The recovery unit 113 recovers the packet (lost packet), which has not been received, although transmitted from the transmission apparatus 100. Methods for recovering the lost packet by the recovery unit 113 include a method for generating a request to re-transmit the lost packet including the information delivered from the analysis unit 112 and transmitting the generated re-transmission request to the transmission apparatus 100 via the transmitting and receiving unit 111, and a method using another packet normally received and a redundant packet used to recover the lost packet. In the present exemplary embodiment, the lost packet is recovered by requesting re-transmission of the lost packet. The recovery unit 113 delivers the packet received by the transmitting and receiving unit 111 and the recovered lost packet to the display unit 114. The display unit 114 displays a video based on the packets delivered from the recovery unit 113.

Figure 2:
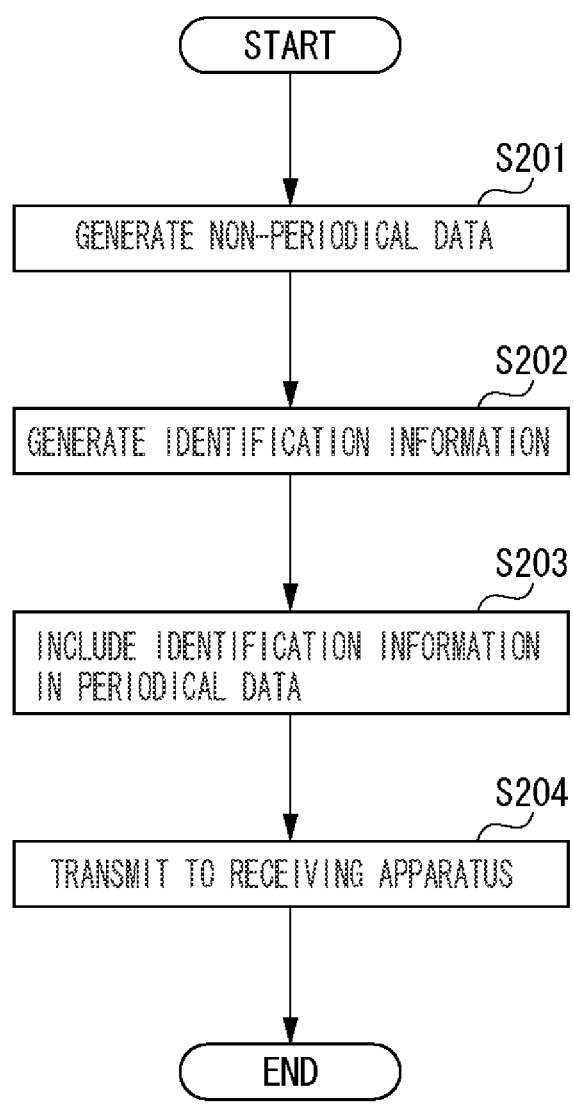
FIG. 2 is a flowchart illustrating packet transmission processing in the first exemplary embodiment.

FIG. 2 is a flowchart illustrating the flow of processing for transmitting video packets (periodical data) and event packets (event data), which is performed in response to the detection of an event by the transmission apparatus 100 according to the present exemplary embodiment.

In step S201, the information generation unit 104 receives information relating to an event notified from the detection unit 101. If the information generation unit 104 receives the information relating to the event, the processing proceeds to step S202.

In step S202 (an identification information generation procedure), the information generation unit 104 generates an event packet based on the information relating to the event. In step S202, the information generation unit 104 generates identification information for the receiving apparatus 110 to identify the generated event packet. In the present exemplary embodiment, a sequence number assigned to the event packet is used as the identification information. If the information generation unit 104 delivers the event packet and the identification information to the information recording unit 105, the processing proceeds to step S203.

In step S203 (a control procedure), the information recording unit 105 records the identification information delivered from the information generation unit 104 in the video packet delivered from the data generation unit 103. More specifically, the information recording unit 105 determines the order in which the video packet and the event packet are transmitted, and includes in the video packet transmitted after the event packet is transmitted, identification information for identifying the event packet. More specifically, in step S203, the information recording unit 105 includes the generated identification information in the video packet (periodical data).

Figure 8:
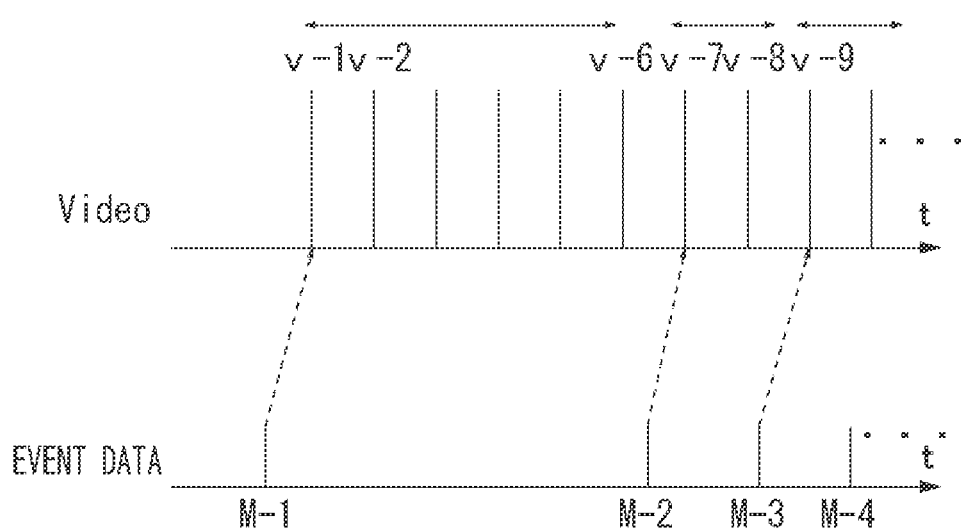
FIG. 8 illustrates an example of transmission timings of periodical data and event data in the first exemplary embodiment.

The information recording unit 105 in the present exemplary embodiment includes identification information in all video packets transmitted after an event packet was transmitted until the succeeding event packet is transmitted. FIG. 8 illustrates examples of video packets and event packets transmitted in the present exemplary embodiment. As illustrated in FIG. 8, the information recording unit 105 includes identification information for identifying an event packet M1 in video packets V1 to V6 transmitted since the event packet M1 was transmitted until the succeeding event packet M2 is transmitted. The information recording unit 105 includes identification information for identifying the event packet M2 in video packets V7 and V8 transmitted since the event packet M2 was transmitted until an event packet M3 is transmitted.

More specifically, the information recording unit 105 includes identification information for the receiving apparatus 110 to identify the transmitted event packet M1 (first event data) in the video packets V1 to V6 (periodical data) transmitted until the succeeding event packet M2 (second event data) is transmitted.

Thus, even when the event packet and the video packet transmitted immediately after the event packet is transmitted are lost, a loss in the event packet can be detected earlier. The present invention is not limited to this. For example, identification information may be included in only a video packet transmitted next to an event packet. Alternatively, identification information may be included in only a predetermined number of video packets transmitted after an event packet is transmitted. If the information recording unit 105 delivers the event packet and the video packet including the identification information to the transmitting and receiving unit 106, the processing proceeds to step S204.

In step S204, the transmitting and receiving unit 106 sequentially transmits the event packets and the video packets to the receiving apparatus 110.

Figure 3:
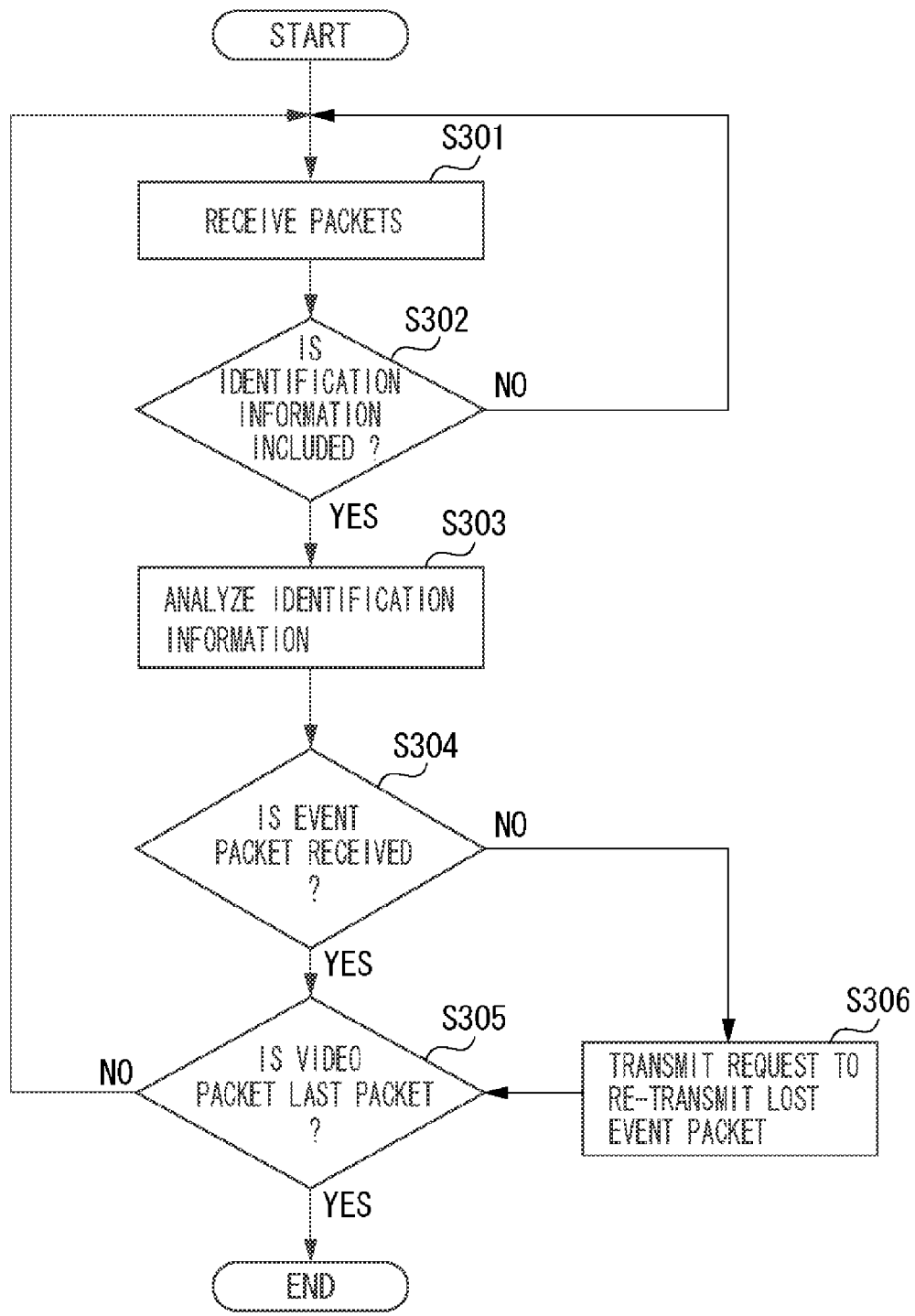
FIG. 3 is a flowchart illustrating processing for detecting a loss in event data by the receiving apparatus according to the first exemplary embodiment.

FIG. 3 is a flowchart illustrating the flow of processing for receiving packets by the receiving apparatus 110. In step S301, the transmitting and receiving unit 111 receives the packets transmitted by the transmission apparatus 100. More specifically, the receiving apparatus 110 receives video packets (periodical data) transmitted at predetermined intervals and event packets (event data) transmitted in response to the occurrence of an event or events by the transmission apparatus 100. If the transmitting and receiving unit 111 receives the video packet, the processing proceeds to step S302.

In step S302, the analysis unit 112 determines whether identification information is included in the video packet received in step S301. The identification information is information for identifying the event packet transmitted by the transmission apparatus 100. If it is determined that the identification information is included (YES in step S302), the processing proceeds to step S303. If it is determined that the identification information is not included (NO in step S302), the processing returns to step S301.

In step S303 (an identification procedure), the analysis unit 112 analyzes the identification information, and identifies the event packet transmitted before the video packet received in step S301 is transmitted. The identification information in the present exemplary embodiment includes a sequence number assigned to the event packet transmitted before the video packet is transmitted. The analysis unit 112 identifies as the transmitted event packet an event packet corresponding to the sequence number included in the identification information. More specifically, in step S303, the analysis unit 112 identifies the event packet (event data) transmitted by the transmission apparatus 100 based on the identification information included in the received video packet (periodical data). If the analysis unit 112 delivers the sequence number assigned to the event packet to the recovery unit 113, the processing proceeds to step S304.

In step S304 (a determination procedure), the recovery unit 113 determines whether the event packet corresponding to the sequence number delivered from the analysis unit 112 is received. More specifically, the recovery unit 113 determines whether the sequence number obtained in step S303 exists in sequence numbers assigned to the event packets received by the transmitting and receiving unit 111. More specifically, in step S304, the recovery unit 113 determines whether the identified event packet (event data) is received. If it is determined that the identified event packet is received (YES in step S304), the processing proceeds to step S305. If it is determined that the identified event packet is not received (NO in step S304), the processing proceeds to step S306.

In step S305, the recovery unit 113 determines whether the video packet received in step S301 is the last packet. The recovery unit 113 determines that the video packet received in step S301 is the last packet (YES in step S305) and delivers the video packet to the display unit 114 when an instruction to finish receiving the video packet is input by a user's operation, for example. Then, the processing ends. On the other hand, if the recovery unit 113 determines that the video packet received in step S301 is not the last packet (NO in step S305), and delivers the received video packet to the display unit 114, the processing returns to step S301.

In step S306 (a transmission procedure), the recovery unit 113 transmits a request to re-transmit the event packet identified by the identification information included in the video packet, to the transmission apparatus 100 via the transmitting and receiving unit 111. More specifically, in step S306, the recovery unit 113 transmits to the transmission apparatus 100 a request to re-transmit the event packet (event data), which has been determined not to be received in step S304.

As described above, the information generation unit 104 in the transmission apparatus 100 generates the event packet (event data) according to the detected event while generating the identification information for identifying the event packet. The information recording unit 105 includes the identification information generated by the information generation unit 104 in the video packet (periodical data) transmitted after the corresponding event packet is transmitted. The transmitting and receiving unit 106 transmits the event packet and the video packet including the identification information to the receiving apparatus 110.

The analysis unit 112 in the receiving apparatus 110 determines whether the event packet identified by the identification information included in the received video packet is received. The recovery unit 113 transmits to the transmission apparatus 100 a request to re-transmit the event packet, which has been determined not to be received by the analysis unit 112.

This enables the receiving apparatus 110 to detect a loss in the event data transmitted in response to the occurrence of the event or events to be detected earlier. Although the information recording unit 105 in the present exemplary embodiment includes the identification information for identifying the event packet (event data) in the video packet (periodical data) transmitted after the event packet is transmitted, the present invention is not limited to this. For example, the identification information maybe included in the video packet transmitted immediately before the event packet is transmitted.

In the present exemplary embodiment, the information recording unit 105 includes the identification information in the video packet generated by the data generation unit 103. However, a video packet including identification information maybe generated based on the video data obtained from the image capturing unit 102 and the information relating to the event detected by the detection unit 101.

The recovery unit 113 in the present exemplary embodiment detects a loss in the video packet (periodical data) based on a sequence number. When the recovery unit 113 detects the loss in the video packet, it transmits a re-transmission request to the transmission apparatus 100. At this time, the transmitting and receiving unit 106 in the transmission apparatus 100 reads out a video packet corresponding to the re-transmission request while reading out an event packet (event data) corresponding to the video packet read out. The transmitting and receiving unit 106 re-transmits the video packet and the event packet, which have been read out. More specifically, the transmitting and receiving unit 106 in the transmission apparatus 100 receives a request to re-transmit a video packet. The transmitting and receiving unit 106 identifies an event packet corresponding to the video packet that has been requested to be re-transmitted. The identified event packet, together with the video packet that has been requested to be re-transmitted, is re-transmitted to the receiving apparatus 110.

This enables the receiving apparatus 110 to make the request to re-transmit the video packet and receive the event packet earlier than it makes the request to re-transmit the event packet corresponding to the identification information included in the re-transmitted video packet.

Although in the present exemplary embodiment, the video packet is taken as an example of the periodical data, the present invention is not limited to this. For example, the present invention can be applied to packets periodically transmitted, e.g., audio packets. More specifically, the receiving apparatus 110 can determine whether an event packet is transmitted even if identification information for identifying the event packet is included in the audio packet.

As a second exemplary embodiment, an example in which a recovering method is switched according to a lost event packet (event data) will be described, centering on a difference from the first exemplary embodiment.

Figure 5:
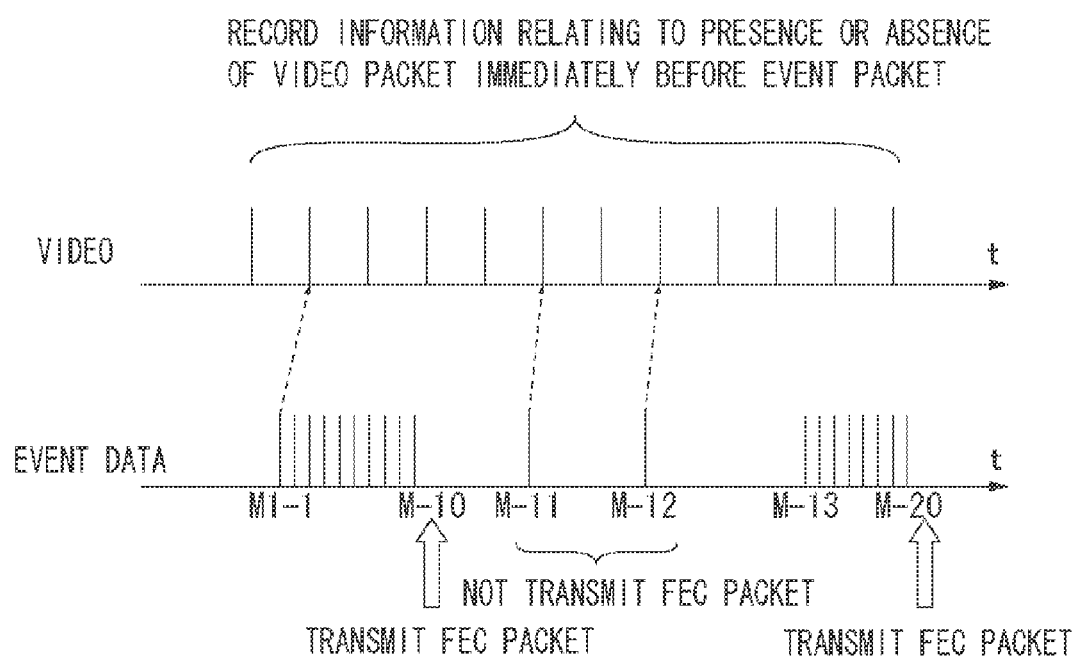
FIG. 5 illustrates packets transmitted in a second exemplary embodiment.

FIG. 5 illustrates an example of video packets (periodical data) and event packets (event data) transmitted from the transmission apparatus 100 to the receiving apparatus 110 according to the present exemplary embodiment. The transmission apparatus 100 transmits the video packets to the receiving apparatus 110 at predetermined intervals, as illustrated on the upper side of FIG. 5. The transmission apparatus 100 transmits event packets M1 to M20 transmitted in response to the occurrence of events, to the receiving apparatus 110, as illustrated on the lower side of FIG. 5. In the present exemplary embodiment, the event non-periodically occurs. The event packets M1 to M10 are transmitted in response to one event. The event packet M11 is transmitted in response to one event. Similarly, the event packet M12 is transmitted in response to one event, and the event packets M13 to M20 are transmitted in response g to one event. More specifically, in the present exemplary embodiment, the number of event packets to be generated differs according to an event which occurs. In FIG. 5, four events occur, and the event packets M1 to M20 are transmitted.

The information generation unit 104 in the present exemplary embodiment generates, when it generates a plurality of event packets for one event, a forward error correction (FEC) packet using the plurality of event packets. The FEC packet is a redundant packet (redundant data) for enabling, even if losses occur in parts of the plurality of event packets, the receiving apparatus 110 to recover the losses. The information generation unit 104 in the present exemplary embodiment exclusive-ORs the plurality of event packets to generate the FEC packet, and uses the FEC packet as the redundant packet. The receiving apparatus 110 according to the present exemplary embodiment can recover the lost event packet, even if one of the plurality of event packets transmitted in response to the one event is lost.

More specifically, the information generation unit 104 generates, based on a combination of the plurality of event packets (event data), a redundant packet for the receiving apparatus 110 to correct losses in the plurality of event packets. A method for generating the redundant packet is not limited to a method using an exclusive-OR operation.

In the example illustrated in FIG. 5, the transmission apparatus 100 generates the FEC packet using the ten event packets M1 to M10, and transmits the FEC packet next to the event packet M10. The transmission apparatus 100 generates the FEC packet using the eight event packets M13 to M20, and transmits the FEC packet next to the event packet M20. The transmission apparatus 100 does not transmit the FEC packet when the event packets M11 and M12 are lost.

Figure 6:
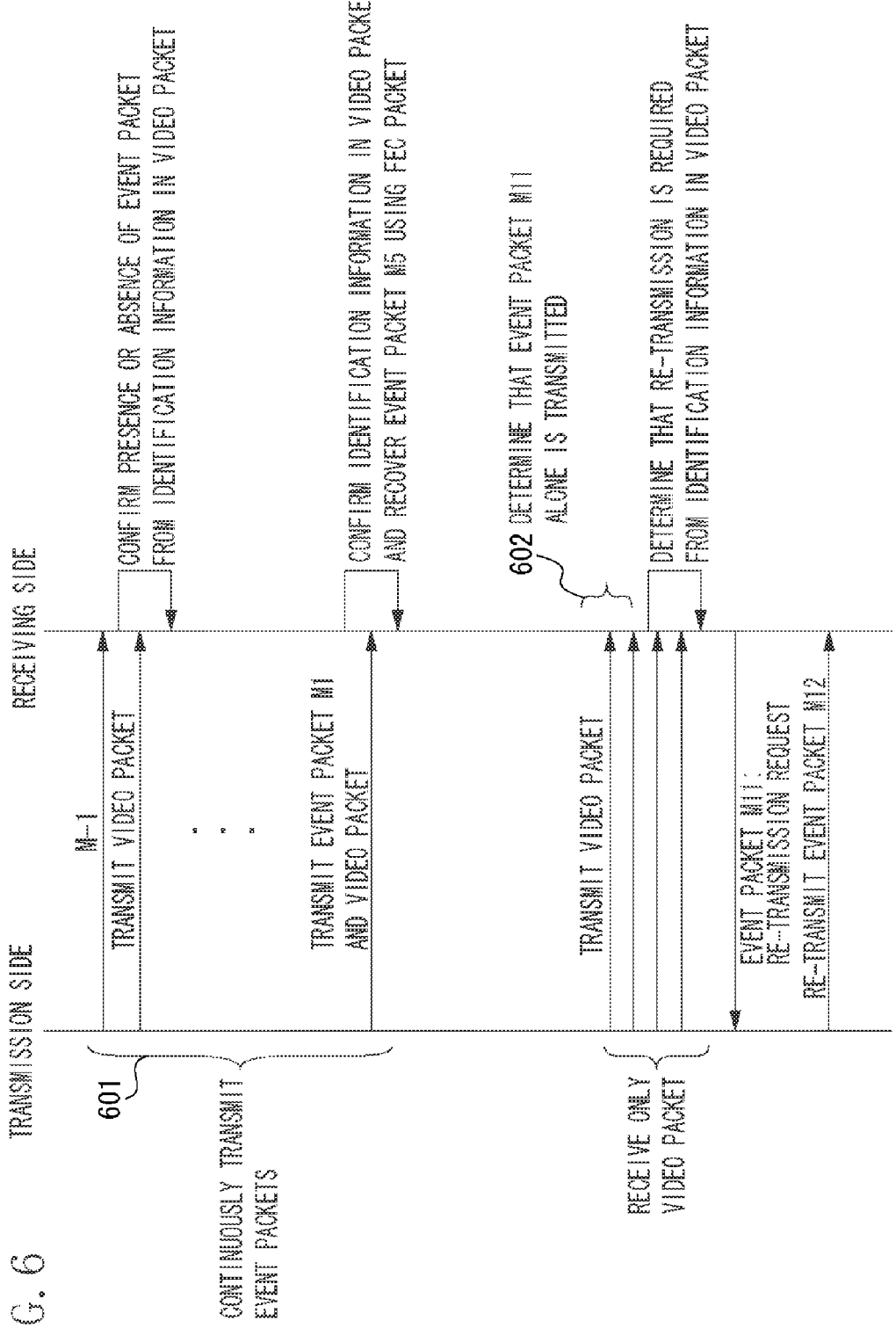
FIG. 6 illustrates processing of a transmission apparatus and a receiving apparatus according to the second exemplary embodiment.

FIG. 6 illustrates an example of the processing of the transmission apparatus 100 and the receiving apparatus 110 according to the present exemplary embodiment. In FIG. 6, the transmission side (the transmission apparatus 100) transmits event packets M1 to M10 to the receiving side (the receiving apparatus 110 (601). As described above, the ten event packets M1 to M10 are generated for one event. The transmission apparatus 100 transmits an FEC packet generated based on a combination of the event packets M1 to M10 after transmitting the event packet M10.

In the example illustrated in FIG. 6, the receiving apparatus 110 does not receive the event packet M5 out of the event packets M1 to M10. In this case, the receiving apparatus 110 detects that it cannot receive the event packet M5 transmitted by the transmission apparatus 100 based on identification information included in a video packet transmitted after the event packet M5 is transmitted. However, the receiving apparatus 110 can recover the lost event packet M5 using the FEC packet transmitted after the event packet M10 is transmitted, and thus does not need to request the transmission apparatus 100 to re-transmit the lost event packet M5.

The followings are methods for determining whether an FEC packet corresponding to a lost (error) event packet exists. As the first method, the determination is made based on whether an event packet is received within a predetermined period of time elapsed since a loss in the preceding event packet was detected. More specifically, when the receiving apparatus 110 continuously receives event packets at short intervals, the event packets correspond to one event. Therefore, it is determined that an FEC packet is transmitted.

In the example illustrated in FIG. 6, the analysis unit 112 in the receiving apparatus 110 determines whether the event packet M6 is received within a predetermined period of time elapsed since a video packet including identification information for identifying the event packet M5 was received. The recovery unit 113 does not transmit a re-transmission request when it receives the event packet M6. The recovery unit 113 corrects a loss in the event packet M5, which has been determined not to be received, using a corresponding FEC packet (redundant data). The FEC packet is received after the event packet M10 is received.

On the other hand, the receiving apparatus 110 does not receive the event packet M11, as illustrated in FIG. 6. The event packet M11 alone is generated according to one event. Therefore, the receiving apparatus 110 does not receive the succeeding event packet M12 within a predetermined period of time elapsed since a video packet including identification information for identifying the event packet M11 was received. The recovery unit 113 transmits a request to re-transmit the event packet M11 to the transmission apparatus 100.

More specifically, the analysis unit 112 determines whether the event packet M12 (second event data) is received within a predetermined period of time elapsed since the video packet including the identification information for identifying the event packet M11 (first event data), which has been determined not to be received, was received. The recovery unit 113 transmits a request to re-transmit the event packet M11 when the analysis unit 112 determines that the event packet M12 is not received.

The recovery unit 113 in the present exemplary embodiment determines, when an FEC packet is received within a predetermined period of time elapsed since a video packet corresponding to a lost event packet was received, that the FEC packet corresponding to the lost event packet also exists.

As the second method for determining whether an FEC packet corresponding to a lost (error) event packet exists, when the information generation unit 104 generates an FEC packet (redundant data), identification information indicating that the FEC packet was generated is generated. The receiving apparatus 110 detects a loss in the event packet by referring to the identification information while determining whether the lost event packet is used to generate the FEC packet. More specifically, the information generation unit 104 in the transmission apparatus 100 generates identification information indicating that the plurality of event packets (event data) combined to generate the FEC packet (redundant data) includes the lost event packet. More specifically, the identification information includes information indicating whether an event packet identified based on the identification information is used to generate an FEC packet.

In this case, the analysis unit 112 in the receiving apparatus 110 determines whether the lost event packet is used to generate the FEC packet based on the identification information. If it is determined that the lost event packet is used to generate the FEC packet, the recovery unit 113 does not make a request to re-transmit the lost event packet. On the other hand, if it is determined that the lost event packet is not used to generate the FEC packet, the recovery unit 113 transmits a request to re-transmit the lost event packet.

More specifically, the analysis unit 112 determines whether the event packet, which has been determined not to be received, is used to generate the FEC packet based on the identification information. The recovery unit 113 transmits the request to re-transmit the event packet, which has been determined not to be used to generate the FEC packet by the analysis unit 112. Also in this manner it can be determined whether an FEC packet corresponding to the event packet, which has not been received by the receiving apparatus 110, exists and processing for recovering the event packet can be switched.

The receiving apparatus 110 according to the present exemplary embodiment does not make, when one of a plurality of event packets corresponding to one event is lost, a request to re-transmit the lost packet, while making, when two or more of the plurality of event packets are lost, a request to re-transmit at least one of the lost packets. In the present exemplary embodiment, an FEC packet is generated using an exclusive-OR operation. When a method for generating an FEC packet having a higher error correction capability is used, however, the two event packets may be recovered even if they are lost. More specifically, if it is determined that a predetermined number or more of event packets (event data) used to generate an FEC packet (redundant data) have not been received, the recovery unit 113 transmits a request to re-transmit the event packets that have been determined not to be received.

The receiving apparatus 110 may not choose whether it makes a re-transmission request. Instead, the transmission apparatus 100 may choose whether it re-transmits an event packet according to a received re-transmission request. More specifically, the information generation unit 104 in the transmission apparatus 100 generates an FEC packet for correcting losses in a plurality of event packets based on a combination of the plurality of event packets. Therefore, the transmitting and receiving unit 106 does not re-transmit, even if it receives a request to re-transmit one of the plurality of event packets combined to generate the FEC packet, the event packet corresponding to the re-transmission request. On the other hand, when requests to re-transmit the plurality of event packets combined in the same manner are received, the lost event packet cannot be recovered using the FEC packet. Therefore, at least a part of the event packets corresponding to the re-transmission requests are re-transmitted. A threshold value for determining whether a re-transmission request is made differs according to a method for generating an FEC packet (redundant data).

More specifically, the transmitting and receiving unit 106 receives a re-transmission request from the receiving apparatus 110. Responsive to a predetermined number or more of the received requests to re-transmit event packets (event data) in the same combination, the transmitting and receiving unit 106 re-transmits the event packets corresponding to the re-transmission requests.

This enables the receiving apparatus 110 to perform the processing as in the present exemplary embodiment even if it does not have the function of switching a recovering method according to a lost event packet.

Figure 7:
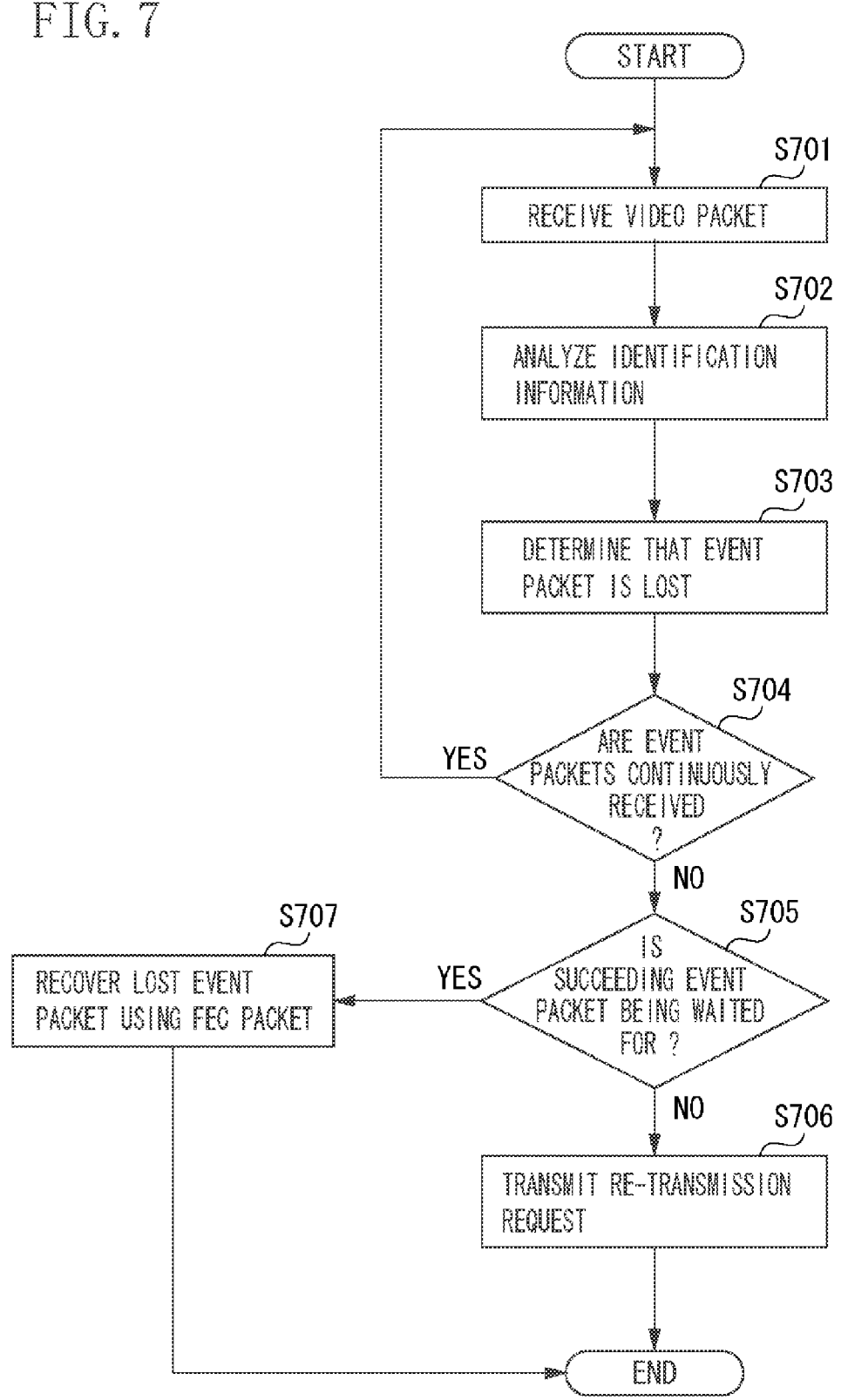
FIG. 7 is a flowchart illustrating processing of the receiving apparatus according to the second exemplary embodiment.

The flow of the processing of the receiving apparatus 110 according to the present exemplary embodiment will be next described with reference to FIG. 7. In step S701, the transmitting and receiving unit 111 receives a video packet (periodical data). The analysis unit 112 determines whether the video packet received by the transmitting and receiving unit 111 includes identification information. More specifically, the process in step S701 illustrated in FIG. 7 includes the processes in steps S301 and S302 illustrated in FIG. 3. If it is determined that the identification information is included in step S701, the processing proceeds to step S702.

In step S702, the analysis unit 112 analyzes the identification information, to identify an event packet transmitted immediately before the video packet is transmitted. The processing then proceeds to step S703.

In step S703, the analysis unit 112 determines whether the event packet identified in step S702 is lost. In the present exemplary embodiment, it is determined that the identified event packet is lost. The processing then proceeds to step S704.

In step S704, the recovery unit 113 determines whether event packets are continuously received. More specifically, the recovery unit 113 determines whether a second event packet is received within a predetermined period of time elapsed since a video packet including identification information for identifying a first event packet was received. If it is determined that the second event packet is received within the predetermined period of time (YES in step S704), the processing returns to step S701. If it is determined that the second event packet is not received (NO in step S704), the processing proceeds to step S705.

In step S705, the recovery unit 113 determines whether the succeeding event packet is being waited for. More specifically, even if it is determined that an event packet succeeding the lost event packet is not received in step S704, the recovery unit 113 determines whether it is to receive the succeeding event packet (being waited for). If the recovery unit 113 determines that it is to receive the succeeding event packet (YES in step S705), the processing proceeds to step S707. In step S707, the recovery unit 113 does not make a request to re-transmit the lost event packet but recovers the lost event packet using an FEC packet.

The followings are methods for determining whether the succeeding event packet is to be received. As the one method, when identification information includes information indicating that a plurality of event packets is combined to generate an FEC packet, the recovery unit 113 determines whether it is waiting for the succeeding event packet based on the identification information. As the other method, the recovery unit 113 may determine whether a lost event packet is one of a plurality of event packets corresponding to one event based on the contents of the event packets so far received. If the recovery unit 113 determines that it is waiting for the succeeding event packet (YES in step S705), the processing proceeds to step S707. If the recovery unit 113 determines that it is not waiting for the succeeding event packet (NO in step S705), the processing proceeds to step S706.

In step S706, the recovery unit 113 transmits a request to re-transmit the lost event packet to the transmission apparatus 100. In step S707, the recovery unit 113 recovers the lost event packet using the FEC packet later received. However, when a predetermined number or more of the plurality of event packets combined to generate the FEC packet are lost, the recovery unit 113 transmits requests to re-transmit the lost event packets, as described above.

As described above, the analysis unit 112 in the receiving apparatus 110 according to the present exemplary embodiment switches the method for recovering the lost event packet depending on whether the lost event packet is one of the event packets combined to generate the FEC packet. More specifically, when the lost event packet is one of the event packets combined to generate the FEC packet, re-transmission is not necessary and the lost event packet is recovered using the FEC packet. On the other hand, if the lost event packet is not used to generate the FEC packet, the lost event packet is recovered by re-transmission.

Thus, time until a part of the plurality of event packets corresponding to one event is recovered becomes shorter than when the lost event packets are recovered by re-transmission.

Although in the present exemplary embodiment, the plurality of event packets corresponding to one event is combined to generate the FEC packet, the present invention is not limited to this. When a plurality of events occurs within a predetermined period of time, for example, an FEC packet may be generated by combining event packets corresponding to the plurality of events. When the number of event packets corresponding to one event is a predetermined number or more, for example, the event packets may be classified into a plurality of groups, to generate an FEC packet in each of the groups. Thus, the lost event packet can be recovered earlier.

As a third exemplary embodiment, an example in which event packets corresponding to a plurality of different events are transmitted in the same period will be described, centering on a difference from the first exemplary embodiment.

Figure 9:
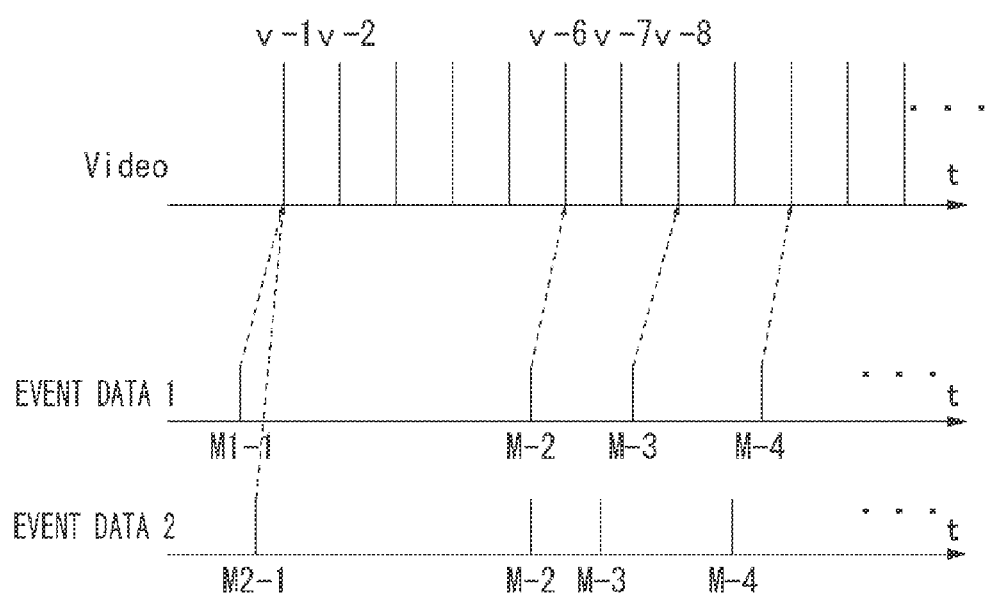
FIG. 9 illustrates an example of transmission timings of periodical data and event data in a third exemplary embodiment.

FIG. 9 illustrates an example in which one type of video packet (periodical data) and two types of event packets (event data) are transmitted. As such an example, the direction of image capturing by the image capturing unit 102 is changed while the transmission apparatus 100 is transmitting a video packet, and the detection unit 101 further detects a person within a captured image at the same timing. At this time, the transmission apparatus 100 transmits to the receiving apparatus 110 event packets (event data 1) for notifying the change in the image capturing direction and event packets (event data 2) for notifying the detection of the person.

In FIG. 9, a video packet V1 is transmitted immediately after both an event packet M1-1 in the event data 1 and an event packet M2-1 in the event data 2 are transmitted. The information recording unit 105 includes identification information for respectively identifying the event packets M1-1 and M2-1 in the video packet V1.

Figure 10:
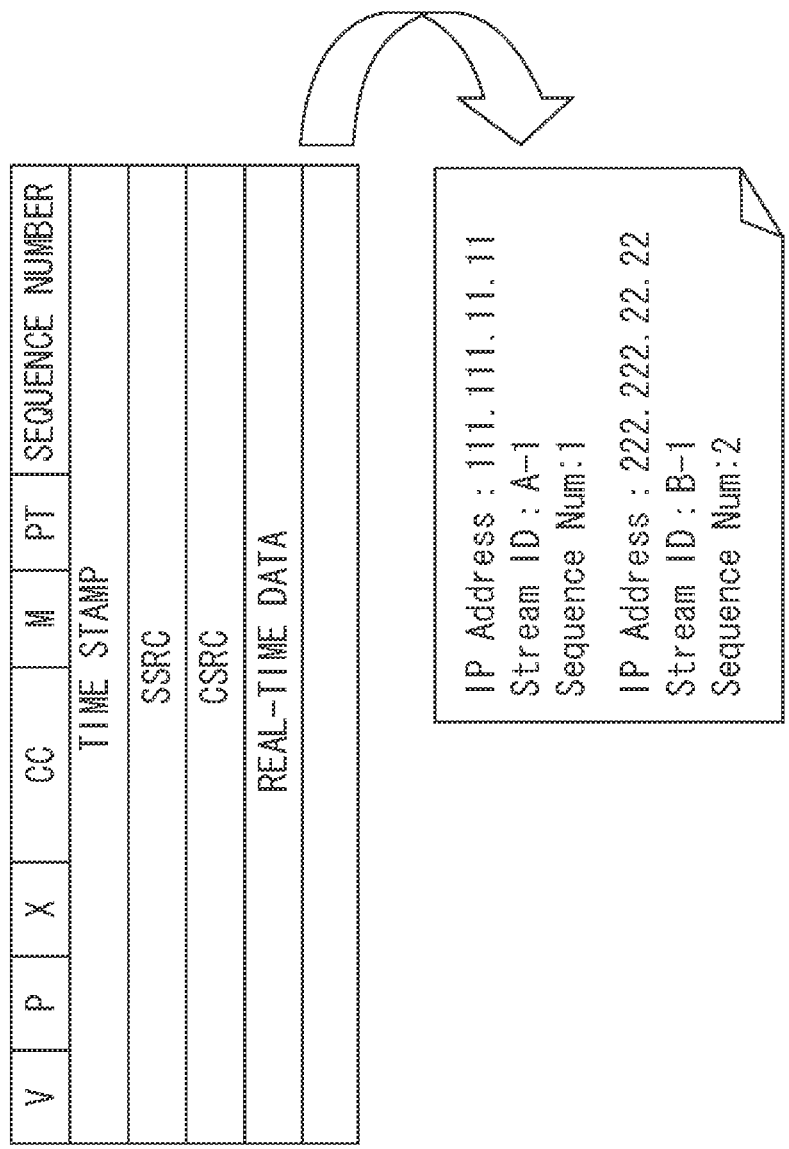
FIG. 10 illustrates an example of identification information in the third exemplary embodiment.

FIG. 10 illustrates an example of identification information recorded by the information recording unit 105 in the present exemplary embodiment. As illustrated in FIG. 10, the identification information includes an internet protocol (IP) address, a stream ID, and a sequence number. The stream ID corresponds to the type of event data. For example, in FIG. 9, the event data 1 and a stream ID:A1 correspond to each other, and the event data 2 and a stream ID:B1 correspond to each other. The receiving apparatus 110 can identify an event packet transmitted from the transmission apparatus 100 using the stream ID and the sequence number.

More specifically, when event data (an event packet M1-1) of a first type is transmitted in response to the occurrence of an event of the first type, and event data (an event packet M2-1) of a second type is transmitted in response to the occurrence of an event of the second type, the following identification information is generated. More specifically, the information generation unit 104 generates first identification information enabling the receiving apparatus 110 to identify the event data of the first type and second identification information enabling the receiving apparatus 110 to identify the event data of the second type. The information recording apparatus 105 includes the generated first and second identification information in the video packet V1 (periodical data) transmitted after the event data of the first and second types are transmitted.

The analysis unit 112 in the receiving apparatus 110 determines whether each of the plurality of event packets is received, when the plurality of event packets (event packets M1-1 and M2-1) is identified based on the identification information included in the received video packet V1.

Thus, the event packets can be also identified when events packet corresponding to a plurality of events are transmitted in the same period.

When the receiving apparatus 110 receives event packets from a plurality of transmission apparatuses, transmission sources of the event packets can be identified based on IP addresses assigned to the transmission apparatuses. A stream ID may include identification information for identifying the transmission apparatus, for example, an IP address assigned to the transmission apparatus.

When stream IDs are generated so that event packets transmitted from a plurality of transmission apparatuses can be identified, there is a method for acquiring from a server that manages all stream IDs, the stream ID in addition to a method for including an IP address assigned to a transmission apparatus in a stream ID. Alternatively, a server may assign identification information to each of transmission apparatuses, and include the assigned identification information in a stream ID including the identification information transmitted by the transmission apparatus.

Other Embodiments

Aspects of the present invention can also be realized by a computer of a system or apparatus (or devices such as a central processing unit (CPU), a micro-processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-143531 filed Jun. 16, 2009, which is hereby incorporated by reference herein in its entirety.

What is claimed is:

1. A transmission apparatus for transmitting video or audio packets sequentially to a reception apparatus and transmitting at least one event packet in response to occurrence of an event to the receiving apparatus, the transmission apparatus comprising:
   an information generation unit configured to generate information used by the receiving apparatus for determining whether the at least one transmitted event packet has been received; and
   a control unit configured to control at least one of the video and audio packets such that the generated information is included in at least one of the video and audio packets.

2. The transmission apparatus according to claim 1, wherein the control unit controls the video or audio packets to transmit with information used by the receiving apparatus for identifying a first event packet a plurality of times before a second event packet following the first event packet is transmitted.

3. The transmission apparatus according to claim 1, further comprising:
   a correction data generation unit configured to generate correction data used by the receiving apparatus for correcting an error in a plurality of event packets based on a combination of the plurality of event packets,
   wherein the information generation unit generates information indicating that the plurality of event packets is combined to generate the correction data.

4. The transmission apparatus according to claim 3, wherein the correction data generation unit generates the correction data based on the combination of the plurality of event packets corresponding to one event.

5. The transmission apparatus according to claim 4, further comprising:
   a receiving unit configured to receive a re-transmission request from the receiving apparatus; and
   a re-transmission unit configured to re-transmit a plurality of event packets corresponding to the one event and re-transmission requests when a number of event packets, re-transmission of which is requested, exceeds a predetermined number.

6. The transmission apparatus according to claim 1, wherein
   in a case where a first event packet of a first type is transmitted in response to occurrence of an event of the first type and a second event packet of a second type is transmitted in response to occurrence of an event of the second type, the information generation unit generates first identification information, with which the receiving apparatus identifies the type of the first event packet, and second identification information with which the receiving apparatus identifies the type of the second event packet; and
   the control unit controls the video or audio packets to transmit with the generated first and second identification information to the reception apparatus after the event packets of the first and second types are transmitted.

7. The transmission apparatus according to claim 1, further comprising:
   a receiving unit configured to receive a request to re-transmit the video or audio packets from the receiving apparatus;
   an identification unit configured to identify the event packet corresponding to the video or audio packets, re-transmission of which has been requested; and
   a re-transmission unit configured to re-transmit the event packet identified by the identification unit, together with the video or audio packets, re-transmission of which has been requested, to the receiving apparatus.

8. The transmitting apparatus according to claim 1, wherein the control unit controls a plurality of the video or audio packets to transmit with the generated information to the reception apparatus after the at least one event packet is transmitted to the reception apparatus.

9. A receiving apparatus for receiving video or audio packets transmitted sequentially by a transmission apparatus and receiving at least one event packet transmitted in response to occurrence of an event by the transmission apparatus, the receiving apparatus comprising:
   a determination unit configured to determine whether the at least one event packet has been received normally based on information attached to at least one of the received video and audio packets; and a transmission unit configured to transmit to the transmission apparatus a request to re-transmit the at least one event packet in accordance with determination by the determination unit.

10. The receiving apparatus according to claim 9, wherein the determination unit determines whether a second event packet has been received within a lapse of a predetermined period of time since the video or audio packets to which the information for identifying a first event packet that has been determined not to be received is attached, and the transmission unit transmits a request to re-transmit the first event packet when the determination unit determines that a second event packet has not been received.

11. The receiving apparatus according to claim 9, further comprising:

a receiving unit configured to receive correction data transmitted by the transmission apparatus;

a correction unit configured to correct an error in an event packet, which has been determined not to be received normally by the determination unit, using the correction data corresponding to the event packet, wherein the attached information includes information indicating whether the event packet identified based on the attached information is used to generate the correction data;

the determination unit determines based on the attached information whether the event packet that has been determined not to be received normally is used to generate the correction data; and the transmission unit transmits the request to re-transmit the event packet, which has been determined not to be used to generate the correction data by the determination unit.

12. The receiving apparatus according to claim 11, wherein the transmission unit transmits a request to re-transmit the event packet that has been determined not to be received normally when the determination unit determines that a predetermined number or more of a plurality of event packets used to generate the correction data have not been received.

13. The receiving apparatus according to claim 9, wherein the determination unit determines that each of a plurality of event packet has been received or not, when the plurality of event packets is identified, based on the information attached to the received video or audio packets.

14. A transmitting method for a transmission apparatus to transmit video or audio packets sequentially and to transmit to a receiving apparatus an event packet in response to occurrence of an event, the transmitting method comprising:

generating information used by the receiving apparatus for determining whether the transmitted event packet has been received normally; and controlling at least one of the video and audio packets such that the generated information is included in at least one of the video and audio packets.

15. The transmitting method according to claim 14, further comprising transmitting a plurality of event packets in response to occurrence of a single event, and the generating information comprises generating the information used by the receiving apparatus for detecting the plurality of event packets transmitted in response to the occurrence of the single event.

16. The transmitting method according to claim 14, further comprising:

receiving a request to re-transmit the video or audio packets from the receiving apparatus;

identifying the event packet corresponding to the video or audio packets, re-transmission of which has been requested; and re-transmitting the identified event packet, together with the video or audio packets, re-transmission of which has been requested, to the receiving apparatus.

17. The transmitting method according to claim 14, wherein the controlling comprises controlling a plurality of the video or audio packets to transmit with the generated information to the reception apparatus after the event packet is transmitted to the reception apparatus.

18. A non-transitory storage medium storing a computer-readable program for transmitting to a receiving apparatus video or audio packets sequentially and transmitting to the receiving apparatus an event packet in response to occurrence of an event, the program comprising:

generating information used by the receiving apparatus for determining whether the transmitted event packet has been received normally; and controlling at least one of the video and audio packets such that the generated information is included in at least one of the video and audio packets.

19. A controlling method carried out by a receiving apparatus for receiving video or audio packets transmitted sequentially by a transmission apparatus and receiving an event packet transmitted in response to occurrence of an event by the transmission apparatus, the controlling method comprising:

determining whether the event packet has been received normally based on information attached to at least one of the received video and audio packets; and transmitting to the transmission apparatus a request to re-transmit an event packet in accordance with determination by the determining step.

20. The controlling method according to claim 19, wherein the determining comprises identifying, based on the attached information, a plurality of the event packets transmitted in response to occurrence of a single event.

21. A non-transitory storage medium storing a computer-readable program for receiving video or audio packets transmitted sequentially by a transmission apparatus and receiving an event packet transmitted in response to occurrence of an event by the transmission apparatus, the program comprising:

determining whether the event packet has been received normally based on information attached to at least one of the received video and audio packets; and transmitting to the transmission apparatus a request to re-transmit an event packet in accordance with determination by the determining step.

* * * * *